United States Patent [19]

Fukuda et al.

[11] Patent Number: 4,985,538

[45] Date of Patent: Jan. 15, 1991

[54] SHRINKABLE POLYESTER FILM

[75] Inventors: Yujiro Fukuda, Machida; Shigeo Utsumi, Yokohama, both of Japan

[73] Assignee: Diafoil Company, Limited, Tokyo, Japan

[21] Appl. No.: 119,623

[22] Filed: Nov. 12, 1987

[30] Foreign Application Priority Data

| Nov. 12, 1986 | [JP] | Japan | 61-269251 |
| Dec. 11, 1986 | [JP] | Japan | 61-295590 |
| Dec. 15, 1986 | [JP] | Japan | 61-298427 |
| Feb. 17, 1987 | [JP] | Japan | 62-33731 |
| Mar. 11, 1987 | [JP] | Japan | 62-56236 |
| Jun. 11, 1987 | [JP] | Japan | 62-145753 |
| Oct. 26, 1987 | [JP] | Japan | 62-269765 |

[51] Int. Cl.$^5$ .................................. C08G 63/183
[52] U.S. Cl. .................. 528/305; 528/308.1; 528/308.2; 528/502
[58] Field of Search ............ 528/308.2, 308.1, 305, 528/502

[56] References Cited

U.S. PATENT DOCUMENTS

| 3,455,720 | 8/1964 | Davies et al. | 528/308.2 |
| 3,595,836 | 7/1971 | Korneli et al. | 528/308.2 |
| 4,020,141 | 4/1977 | Quinn et al. | |
| 4,072,779 | 2/1978 | Knox et al. | 528/308.2 |
| 4,096,126 | 6/1978 | Tanaka et al. | 528/305 |
| 4,141,735 | 2/1979 | Schrader et al. | 528/309 |
| 4,275,107 | 6/1981 | Bartkus et al. | 528/308.2 |
| 4,362,775 | 12/1982 | Yabe | 428/213 |
| 4,476,170 | 10/1984 | Jabarin | 528/308.2 |
| 4,535,025 | 8/1985 | Jabarin | 528/308.2 |
| 4,546,030 | 10/1985 | Minami et al. | 528/308.2 |
| 4,603,073 | 7/1986 | Renalls et al. | 528/308.2 |
| 4,751,139 | 6/1988 | Hensel et al. | 528/308.2 |

FOREIGN PATENT DOCUMENTS

| 210646 | 2/1987 | European Pat. Off. | |
| 1187792 | 2/1965 | Fed. Rep. of Germany . | |
| 57-42726 | 3/1982 | Japan . | |
| 57-159618 | 10/1982 | Japan . | |
| 57-194950 | 11/1982 | Japan . | |
| 0045202 | 3/1984 | Japan | 528/308.1 |
| 59-97175 | 6/1984 | Japan . | |
| 60-206839 | 10/1985 | Japan . | |
| 60-232948 | 11/1985 | Japan . | |
| 60-253545 | 12/1985 | Japan . | |
| 60-64430 | 4/1986 | Japan . | |
| 61-203161 | 9/1986 | Japan . | |
| 62-95341 | 5/1987 | Japan . | |
| 63-55052 | 3/1988 | Japan . | |
| 825549 | 12/1959 | United Kingdom . | |
| 2193682 | 2/1988 | United Kingdom . | |

Primary Examiner—John Kight, III
Assistant Examiner—Dennis R. Daley
Attorney, Agent, or Firm—Oblon, Spivak, McClelland, Maier & Neustadt

[57] ABSTRACT

A shrinkable polyester film having a sufficient shrinkage, a sufficient resistance to solvent for printing ink, a shrinking property not to cause wrinkles, a warm water resistance sufficient for preventing wrinkles, slack and whitening is disclosed herein.

The shrinkable polyester film of the present invention may be used as labels for various vessels such as glass bottle, heat-resistant PET bottle and non heat-resistant PET bottle.

13 Claims, No Drawings

SHRINKABLE POLYESTER FILM

BACKGROUND OF THE INVENTION

The present invention relates to a shrinkable polyester film, and more in detail, relates to a shrinkable polyester film suitable for labels used on PET (polyethylene terephthalate) bottles or other bottles and for various packaging.

Hitherto, as the shrinkable film used for packaging or labelling, a film of polyvinyl chloride, a film of polystyrene, etc. have been broadly used. However, the polyvinyl chloride film has the difficulties in disposal, that is, the polyvinyl chloride film has a high combustion calorie and generates harmful hydrogen chloride when it is burnt. And the polystyrene film has a defect of poor resistance to weather. Accordingly, a film of the other polymer which is suitable for the purpose has been desired.

Hereupon, as the characteristics necessary for the shrinkable film for packaging and labelling, the sufficient shrinkage, the resistance to solvents such as printing ink, the shrinking property not to cause wrinkles on the label at the time of shrinking treatment, the warm water-resistance not to cause wrinkles, slack and whitening, etc. in the warm water treatment carried out after shrinking treatment of the film for the sterilization of the bottle may be mentioned.

For the above-mentioned demands, it has been disclosed that a film having a sufficient shrinkage and being excellent in heat sealing property can be obtained by monoaxially stretching a noncrystalline copolyester, a blend of a noncrystalline copolyester and a crystalline polyester or a blend of two or more kinds of crystalline polyester in the machine direction or the transverse direction (refer to Japanese Patent Applications Laid-Open (KOKAI) Nos. 57-42726(1982), 57-159618(1982) and 59-97175(1984)). However, even in such a film, the satisfactory shrinking properties and the warm water-resistance could not be obtained, and particularly concerning the shrinkable properties, such a film is apt to cause wrinkles at the time of shrinking treatment as compared to the conventional films of polyvinyl chloride, etc. Namely, the above films hitherto proposed encounter with a severe problem in the practical use.

Furthermore, in recent years, it has been desired to use a shrinkable film to the containers of various shapes, and the respectively different characteristics have been demanded corresponding to the properties of the various containers, particularly widely used containers for the soft drinks such as PET bottle, glass bottles of a large type with a small mouth, heat-resistant PET bottle and non heat-resistant PET bottle. Accordingly, it has been demanded to obtain a shrinkable film of polyesters which satisfies the respective characteristics.

SUMMARY OF THE INVENTION

In a first aspect of the present invention, there is provided a shrinkable polyester film which comprises not less than 50 mol % of ethylene terephthalate unit as the constitutional repeating unit and has the birefringence of 0.040 to 0.150, the shrinkage of not less than 40% in one direction of the machine direction and the transverse direction after 5 min treatment in an air oven at 100° C., the shrinkage of not more than 20% in the other direction after 5 min treatment in an air oven at 100° C. and the heat of fusion of not less than 2 cal/g.

In a second aspect of the present invention, there is provided a shrinkable polyester film which comprises not less than 50 mol % of ethylene terephthalate unit as the constitutional repeating unit and has the shrinkage of not less than 30% in one direction of the machine direction and the transverse direction after 5 sec treatment in a warm water at 75° C. and the maximum shrinkage (the neck-in rate) defined in the specification of not more than 20% in the other direction after 5 sec treatment in a warm water at 75° C.

In a third aspect of the present invention, there is provided a shrinkable polyester film which comprises not less than 50 mol % of ethylene terephthalate unit as the constitutional repeating unit and has the shrinkage of not less than 20% in one direction of the machine direction and the transverse direction after 5 min treatment in an air oven at 100° C., the elongation at break of 1 to 100% in the other direction and the heat of fusion of not more than 8 cal/g.

The object of the present invention lies in providing a shrinkable polyester film which is excellent in the various shrinking properties.

Another object of the present invention lies in providing a shrinkable polyester film which is excellent in the resistance to warm water.

Still another object of the present invention lies in providing a shrinkable polyester film which is excellent in the breaking strength.

Still another object of the present invention lies in providing a shrinkable polyester film which is excellent in color tone.

Still another object of the present invention lies in providing a shrinkable polyester film which is suitable for use as the label.

The above-mentioned objects can easily attained by the present invention as follows.

DESCRIPTION OF THE PREFERRED EMBODIMENT

The present invention will be explained in detail as follows.

The polyester constituting the shrinkable film of the present invention is the polyester comprising ethylene terephthalate unit of not less than 50 mol %, preferably 65 to 95 mol %. As the remaining constitutional units, one or more kinds of units other than ethylene terephthalate unit, which comprises a dicarboxylic acid component and a diol component may be contained. As the dicarboxylic acid component other than terephthalic acid, oxalic acid, malonic acid, succinic acid, adipic acid, azelaic acid, sebacic acid, phthalic acid, isophthalic acid, naphthalenedicarboxylic acids, diphenyl ether dicarboxylic acid, etc. may be mentioned, and as the diol component other than ethylene glycol, neopentyl glycol, propylene glycol, trimethylene glycol, tetramethylene glycol, hexamethylene glycol, diethylene glycol, polyalkylene glycol, 1,4-cyclohexane dimethanol, etc. may be mentioned.

Besides, the polyester preferable in the present invention contains terephthalic acid units as the main dicarboxylic acid component, and contains 97 to 50 mol %, preferably 97 to 70 mol % of ethylene glycol units and 3 to 50 mol %, preferably 3 to 30 mol % of neopentyl glycol unit as the glycol unit.

It is possible to increase the amorphous portion of the polyester containing neopentyl glycol unit while holding the glass-transition temperature ($T_g$) and the melting point ($T_m$) thereof relatively higher as compared to the other polyesters. Accordingly, it is considered that the polyester used in the present invention can have the amorphous portion necessary for a shrinkable film as well as the excellent heat-resistance.

The glass-transition temperature ($T_g$) of the polyester containing neopentyl glycol unit is preferably not lower than 65° C., more preferably not lower than 70° C. Since a film produced from polyester of $T_g$ of below 65° C. is poor in heat-resistance, it is apt to cause distortion in the periphery of the heat-sealed part after shrinking, and accordingly, such a polyester is not desirable.

Further, the other preferable polyester used in the present invention includes a polyester formed by polymerization of the major starting material comprising terephthalic acid and isophthalic acid in the molar ratio of from 50/50 to 95/5 and further ethylene glycol, as the major constituting component.

In the polycondensation reaction in the production of the polyester used in the present invention, any catalyst employed in the conventional method may be used. An antimony compound such as antimony trioxide, antimony trichloride, antimony acetate and antimony glycollate; a germanium compound such as germanium dioxide and germanium glycollate and a titanium compound such as titanium tetrapropoxide and titanium tetrabutoxide are usually used.

The antimony compound is very preferred as the catalyst for the polycondensation producing the polyester, particularly, the polyester which comprises terephthalic acid and isophthalic acid in the molar ratio of 50/50 to 95/5 as the dicarboxylic acid component, since the molten thermal stability of the obtained polyester is highly excellent. Furthermore, it is particularly preferable in order to improve the molten thermal stability of the polyester that the polyester does not contain any metal compound which is soluble in the polyester except for the antimony compound used as the catalyst for polycondensation.

The amount of such a catalyst for polycondensation is preferably from 200 to 700 ppm, more preferably from 200 to 500 ppm to the amount of the polyester. In the case where the amount of the catalyst is below 200 ppm, since the reaction rate of polycondensation becomes extremely low, therefore, not preferred.

The molten thermal stability of the polyester can be extremely improved by taking the above method, and further in the process of making the thus produced polyester into films, the generation of the sublimed material is minimized and the films excellent in color tone are obtainable.

In general, the intrinsic viscosity of the polyester used in the present invention is preferably not less than 0.50, more preferably not less than 0.60 and particularly preferably not less than 0.65. In the case where the intrinsic viscosity is below 0.50, the degree of crystallinity of the polyester is so high and the shrinkage of a film produced from such polyesters becomes lower, and accordingly such a case is not preferred.

In the next place, the method for producing the film according to the present invention will be shown below.

After drying the crystalline polyester, in which inorganic particles have been contained for imparting slipping property to the film, in the same conditions as those for drying the usual polyethylene terephthalate or the copolymer thereof, the thus dried polyester is processed into an unstretched film by extrusion. The thus obtained unstretched film is monoaxially stretched into the machine direction or the transverse direction.

As the method of stretching, not only the method of monoaxially stretching in the machine direction by rolls and the method of monoaxially stretching in the transverse direction by a tenter, it is also possible to employ a known biaxial stretching in which the film is stretched strongly in one direction (the machine direction or the transverse direction) while stretched weakly in the other direction. After heat-setting the thus obtained film at a temperature of not higher than 120° C., as occasion demands, the thus treated film is wound up to be the product.

The thickness of the thus obtained film is not particularly limited, however, the preferable thickness as the shrinkable film is from 2 to 500 $\mu$m, more preferably from 5 to 300 $\mu$m.

It is preferable that the birefringence of the film (film A) according to the present invention is not less than 0.040 and not more than 0.150, and the shrinkage of the film in one direction of the machine direction and transverse direction is not less than 40% and that of in the other direction is not more than 20% after 5 min treatment in an air oven at 100° C.

The more preferable birefringence of the film A is 0.040 to 0.120 and further preferably 0.040 to 0.100. The film having the birefringence of below 0.040 is extremely poor in solvent-resistance, and in the case where the sterilization by warm water is carried out after applying such a film onto a bottle, the warm water-resistance of the film is extremely poor and the film whitens after sterilization and the wave-like wrinkles and slack are caused on the film.

Furthermore, in order to use the film (film A) according to the present invention as a shrinkable film, it is preferable that the shrinkage of the film in one direction of the machine direction and the transverse direction (the main shrinking direction) is not less than 40%, more preferably not less than 50% and further preferably not less than 65%, after treating the film for 5 min in an air oven at 100° C. On the other hand, it is preferable that the shrinkage of the film in the other direction is not more than 20%, and more preferably not more than 15%.

Of the films A, the film particularly suitable as the shrinkable film for glass bottles of large type is the film having the shrinkage in the main shrinking direction of not less than 65% and the shrinkage in the other direction of not more than 15%. These shrinkages are converted into the respective shrinkage of not less than 60% and not more than 15% after treating the film for 30 sec in a warm water at 85° C.

The film even showing the shrinkage in the main shrinking direction of not less than 40% is unsuitable for that purpose in the case where the shrinkage in the other direction is over 20% because the deformation of the drawing or letter printed on the film is caused.

The shrinkage in the main shrinking direction of the film A according to the present invention after printing drawing and letters thereon is preferably not less than 40% and more preferably not less than 50% after 5 min treatment in an air oven at 100° C. In the case where the shrinkage in the main shrinking direction becomes below 40% after printing drawing or letters thereon using a usual solvent for a printing ink, for instance, a mixed solvent of methyl ethyl ketone and ethyl acetate, the thus treated film does not closely adhere to the curved part of the bottle and accordingly, such a case is undesirable.

It is preferable that the heat of fusion of the film A according to the present invention is not less than 2 cal/g, more preferably not less than 4 cal/g and particularly preferably not less than 5 cal/g. In the case of the film of the heat of fusion of below 2 cal/g, the drying method usually used for polyethylene terephthalate cannot be adopted in the step before forming the unstretched film by extrusion. Accordingly, there occurs a necessity of installing a new type of drier. Since such a installation of a new drier causes the cost-up, the film of the heat of fusion of below 2 cal/g is unsuitable for the purpose of the present invention.

It is preferable that the film haze of the film A according to the present invention is not more than 20%, more preferably not more than 15% and further preferably not more than 10% after immersing the film for 30 min in a warm water at 85° C. under the tensioned and fixed condition. The shrinkable film for use in labelling is subjected to sterilization together with the bottle which is labelled by the film using a warm water at from 80° to 90° C. In the case of the film which shows the film haze of over 20% after the warm water treatment, the whitening and the blur are caused to lose the transparency of the film, and accordingly such a film is undesirable.

It is preferable that the unevenness of the thickness of the film A according to the present invention in the machine direction and in the transverse direction is not more than 30%, more preferably not more than 20% and further preferably not more than 15%. Shrinkable films of polyesters are generally said to have a large defect that the wrinkles are apt to be formed in the film after shrinking treatment of passing through the shrink tunnel as compared to the conventional shrinkable film of polyvinyl chloride, etc. However, the above-mentioned defect is remarkably improved by controlling the unevenness of the thickness of the shrinkable film of polyesters both in the machine direction and in the transverse direction much smaller than the level of the unevenness of the thickness of the conventional shrinkable film, namely not more than 30%, preferably not more than 20% and further preferably not more than 15%.

Although it is preferable that the static friction coefficient of the film A according to the present invention is not more than 1.2, more preferably not more than 1.0 and further preferably 0.2 to 1.0. In the case where the static friction coefficient is over 1.2, blocking between the film and the bottle is caused at the time of shrinking treatment to hinder the smooth shrinking. As a result, the film is apt to form wrinkles after shrinking treatment, and accordingly such a film is undesirable. On the other hand, in the case where the static friction coefficient of the film is less than 0.2, it is difficult to closely attach the film to the position on which the film must be attached, because the film is apt to move up and down during shrinking treatment. Namely, such a film is undesirable.

The degree of crystallinity of the film according to the present invention is preferably not more than 15%, more preferably not more than 10% and still more preferably not more than 5%. It is considered that the shrinking stress scarcely generates in the crystalline phase at the time of heating, however, in the case where the degree of crystallinity of the film is over 15%, a non-uniform shrinking stress generates in the film, and as a result, wrinkles are apt to be formed on the film. Accordingly, such a case is undesirable.

The breaking strength of the film A according to the present invention in the main shrinking direction is preferably not less than 20 kg/mm$^2$, and more preferably not less than 25 kg/mm$^2$. In the case where the breaking strength is below 20 kg/mm$^2$, the breaking of the film attached on bottle occurs frequently at the time of transporting the products. Accordingly, such a case is undesirable.

At the time when the film A according to the present invention is exposed to a weathermeter while following the method of Japanese Industrial Standards (JIS) A-1415, the time retaining the stretching elongation not less than 5% in the direction perpendicular to the main shrinking direction is preferably not less than 100 hours, and more preferably not less than 200 hours. In the case where the time is below 100 hours, the weather-resistance of such a film is insufficient and such a film is undesirable.

The shrinking stress of the film A according to the present invention in the main shrinking direction is preferably not less than 100 g/mm$^2$, more preferably not less than 300 g/mm$^2$ and still more preferably not less than 500 g/mm$^2$. In the case where the shrinking stress of the film is below 100 g/mm$^2$, the close adhesion of the film to the bottle is insufficient and accordingly such a film is undesirable.

After keeping the film A according to the present invention in an air oven at 40° C. for 2 weeks, the shrinkage of the film both in the machine direction and in the transverse direction is preferably not more than 3% and more preferably not more than 2%. In the case where the shrinkage of the film is over 3%, wrinkles are generated on the film due to curling and shrinking during the storage of the film in a warehouse after film forming or printing and before attaching the film to the bottle, and accordingly such a case is undesirable.

The polyester film A according to the present invention, which has the above-mentioned physical properties can be produced according to the previously described method while employing the extrusion temperature of the polyester of 200° to 300° C., the stretching ratio of 1.6 to 5.0, the stretching temperature of $T_g$ (glass transition temperature) $-10°$ C. to $T_g + 50°$ C.

The thus obtained shrinkable film according to the present invention is produced from the cheap polymer as the raw material, is excellent in color tone and in various physical properties such as the shrinking property, warm water resistance, strength, etc. and is suitable for use in labelling and packaging.

Another preferable film (film B) according to the present invention is the film in which the shrinkage in one direction (the machine direction or the transverse direction) is not less than 30% after treating the film for 5 sec in warm water at 75° C. and that the specific (maximum) shrinkage (the neck-in rate) of the film in the direction perpendicular to the main shrinking direction is not more than 20% after treating the film for 5 sec in warm water at 75° C.

The preferable shrinkage of the film according to the present invention is not less than 40% and more preferably not less than 45%. The shrinkage of the film in the direction perpendicular to the main shrinking direction, measured under the same condition, is preferably not more than 10% and more preferably not more than 5%.

Since the predetermined temperature of the shrink zone in the shrink tunnel used for the non heat-resistant PET bottles, etc. is low as below 80° C., the film showing the shrinkage of below 30% in the main shrinking direction cannot closely adhere to the vessel and accordingly such a film is undesirable. Besides, deformation of drawings is caused in the case of the film showing the shrinkage of over 10% in the direction perpendicular to the main shrinking direction. Namely, such a film is undesirable as the shrinkable film for use in labelling.

The preferable neck-in rate of the film according to the present invention is not more than 18% and more preferably not more than 15%. In the present invention, the neck-in rate has been measured on the rectangular sample of 13 cm in the main shrinking direction and of 10 cm in the direction perpendicular to the main shrinking direction, and the size of such sample are the average size for the shrinkable label generally used.

It has been found by the present inventors that the neck-in rate is closely related to the uneven shrinkage such as oblique deformation or distortion of the film after passing through the shrink tunnel. Namely, in the case of the film showing the neck-in rate of over 20%, the uneven shrinkage occurs frequently and such a film is very undesirable in the practical use.

The birefringence of the film B according to the present invention is preferably not less than 0.050, and more preferably 0.050 to 0.150. In the case of the film showing the birefringence of over 0.150, the shrinking stress in the main shrinking direction becomes very high and the shrinking of the film occurs very rapidly. Accordingly, wrinkles and distortion are apt to occur on the film after shrinking treatment, and such a film is undesirable.

The above another preferred film B according to the present invention having the above-mentioned physical properties can be produced by mono- or biaxially stretching unstretched film in accordance with the previously described method and then heat-setting the thus obtained mono- or biaxially stretched film, preferably at a temperature of the final stretching temperature to 100° C. for 0.1 sec to 5 min in order to obtain the film having the desired neck-in ratio. UV irradiation may be employed instead of or together with the heat-set. The energy of UV irradiation can be selected from the range of 0.1 to 1000 mJ/cm$^2$, preferably 0.1 to 100 mJ/cm$^2$ based on the film area.

Since such another preferred film according to the present invention has a high shrinkage at a temperature not higher than 80° C., such a film is suitable as the shrinkable film for non heat-resistant PET bottle which changes the volume thereof at a temperature not lower than about 80° C.

Furthermore, still another preferred film (film C) according to the present invention is the film in which the shrinkage in one direction (the machine direction or the transverse direction) is not less than 20% after treating for 5 min in an air oven at 100° C., the elongation at break in the direction perpendicular to the main shrinking direction is 1 to 100%, and the heat of fusion is not more than 8 cal/g.

The preferable shrinkage of the film according to the present invention is not less than 30%. In the case where the shrinkage of the film in the main shrinking direction is below 20%, the degree of shrinking is insufficient when the film is subjected to shrinking treatment as the label and the thus treated film does not closely adhere to the vessel. Namely, the film showing such a shrinkage of below 20% is undesirable.

The preferable elongation at break is 2 to 50%. As a result of the present inventors' examination for the improvement of the shrinking properties of shrinkable films for labelling, it has been found by the present inventors that there is a very close correlation between the elongation at break and the shrinking properties of the film, although such a correlation is considered not to exist between these matters. Namely, when the film showing the elongation at break of over 100% is subjected to shrinking treatment as a label, distortion is apt to occur on the label and the upper end or the lower end of the label likely deforms obliquely Accordingly such a film is undesirable. Also, the film having the elongation at break of lower than 1% is undesirable for the practical use, because such a film is liable to tear in the direction parallel to the main shrinking direction.

The preferable heat of fusion of the film according to the present invention is not more than 6 cal/g and more preferably 2 to 6 cal/g. The shrinking properties of the film showing the heat of fusion of over 8 cal/g are deteriorated and accordingly such a film is undesirable. It is considered that the deterioration is due to the unevenness of the shrinking of the film caused by the crystallization of the polyester of the film which proceeds when the film is heated in the shrink tunnel.

Besides, in the case of the film showing the heat of fusion of below 2 cal/g, the drying method for the polymer which is used generally to polyethylene terephthalate in the drying step before processing the polymer into a film by extrusion, cannot be adopted, and a necessity of installing a new drier occurs. Since such a new installation causes the cost-up of the product, such a film is unsuitable for the purpose of the present invention.

The shrinkage of the film C according to the present invention in the main shrinking direction after keeping the film for 2 weeks in an air oven at 40° C. is preferably not more than 3%, more preferably not more than 2% and still more preferably not more than 1%. In the case where the shrinkage of the film is over 3%, the label made from the film causes the dimensional change during the storage, and such a film is undesirable.

The preferable birefringence of the film C according to the present invention is 0.040 to 0.120 and still more preferably 0.040 to 0.090. The film showing the birefringence of below 0.040 is poor in warm water-resistance, solvent-resistance, etc., and is undesirable for the purpose of the present invention.

It is preferred that the special (maximum) shrinkage (neck-in rate) of the film C according to the present invention in the direction perpendicular to the main shrinking direction is not more than 10% and more preferably not more than 5% after treatment of the film for 5 sec in warm water at 75° C.

The breaking strength of the film C according to the present invention in the direction perpendicular to the main shrinking direction is preferably not less than 3 kg/mm$^2$ and more preferably not less than 5 kg/mm$^2$. Since the film showing the breaking strength of below 3 kg/mm$^2$ is apt to tear in the direction parallel to the main shrinking direction, such a film is undesirable for practical use.

The shrinkage of the film C according to the present invention in the direction perpendicular to the main shrinking direction after treating the film for 5 min in an air oven at 100° C. is preferably not more than 15%, more preferably not more than 10% and still more preferably not more than 5%. The film showing the shrinkage of over 15% shrinks to a large extent along the longitudinal direction of the vessel when the film is subjected to shrinking treatment as a label and the deformation of the drawing on the label occurs. Namely, such a film is undesirable.

The average surface roughness of the film C according to the present invention is preferably from 0.005 to 0.1 μm and more preferably from 0.005 to 0.05 μm. The slipping property of the film showing the average surface roughness of not more than 0.005 μm is poor and blocking is generated between the vessel and the label made of the film. Accordingly, the shrinking of the label cannot be carried out smoothly, and such a film is undesirable. Besides, the transparency of the film showing the mean surface roughness of over 0.1 μm is poor and accordingly, such a film is undesirable.

Still another preferable film, described above, having the above-mentioned physical properties according to the present invention can be produced by the previously described method in which the heat-set treatment or UV irradiation is carried out, while adopting a suitable combination of the extrusion temperature of the polyester, the rate of stretching the film and the stretching temperature of the film.

The thus obtained still another preferable film according to the present invention does not cause distortion during shrinking treatment at a high temperature, and accordingly the film is suitable as the shrinkable film for use in heat-resistant PET bottle and glass bottle which require the shrinking treatment at a high temperature and for a short time.

Necessary informations such as drawing and letter are printed on the film according to the present invention by the conventional method and the printed film is put on a vessel such as PET bottle to be subjected to shrinking treatment according to the method well known in the labelling and packaging industry.

The present invention will be explained more precisely while referring to the following non-limitative Examples.

Besides, the methods of evaluation of the films are shown as follows.

(1) Shrinkage A

A specimen of the film of a strip form of 1 cm in width was subjected to shrinking treatment for 5 min in a geared oven at a temperature of 100±2° C. without load and the shrinkage was calculated from the following formula:

$$\text{shrinkage } A = \frac{L_0 - L}{L_0} \times 100$$

wherein $L_0$ is the original length of the specimen (10 cm) and L is the length of the specimen after shrinking treatment.

Furthermore, after printing a drawing on the film while using a printing ink in which a 30:70 mixed solvent of methyl ethyl ketone and ethyl acetate was used, the shrinkage of the thus treated film was measured.

(2) Birefringence (Δn):

By using a polarizing microscope made by Karl Zeiss Company, the retardation of the film was measured, and the birefringence (Δn) of the film was obtained according to the following formula:

$$\Delta n = R/d$$

wherein R is the retardation of the film and d is the thickness of the film.

(3) Heat of fusion of the film (cal/g)

The area under the temperature-time curve obtained by the fusion of the film under the conditions of sensitivity of 4, temperature increasing speed of 16° C./min and chart speed of 40 mm/min using DSC-1B produced by Perkin Elmer Corp. was calculated and the heat of fusion of the film was calculated according to the following formula:

$$\text{Heat of fusion} = A \cdot S \cdot \frac{1}{m}$$

wherein A is the heat of fusion of indium per unit area (cal/cm$^2$) on the chart under the same conditions as above; S is the total area under the fusion curve of the film and m is the weight (g) of the film.

(4) Film haze

The total haze of the film was obtained by an integrating sphere turbidometer NDH-20D made by NIPPON DENSHOKU Ind. Company while following Japanese Industrial Standards (JIS) K 6714. Furthermore, the film haze was measured after fixing the film to a metal frame under a strain and immersing the thus treated film into warm water at 85° C. for 30 min. In the case where wave-like wrinkles were generated on the film and the measurement could not be carried out, x mark was described in the Tables.

(5) Unevenness of thickness of the film

The unevenness of the thickness of the film was measured over the length of 3 m along the machine direction and the transverse direction of the mono- or biaxially stretched film while using a continuous measuring apparatus for film thickness (made by ANRITSU Electric Company, using an electronic micrometer), and calculated according to the following formula:

$$\text{Unevenness of thickness (\%)} = \frac{T\max - T\min}{T\text{mean}} \times 100$$

wherein $T\max$ is the maximum thickness of the film; $T\min$ is the minimum thickness of the film and $T\text{mean}$ is the mean thickness of the film.

(6) Static friction coefficient

The static friction coefficient of the film was obtained on the basis of the maximum friction force just before the film began to slide obtained by pilling the two films on a smooth and flat glass plate, placing a rubber plate on the thus pilled films, further placing a road on the thus placed rubber plate so that the pressure thereon is adjusted to 2 g/cm$^2$ and sliding the film against the other film at the speed of 20 mm/min.

(7) Shrinkage B

The film was subjected to shrinking treatment for 30 sec in a warm water at a temperature of 85°±2° C. without load, and the shrinkage of the film was obtained according to the following formula:

$$\text{Shrinkage } B (\%) = \frac{L_0 - L}{L_0} \times 100$$

wherein $L_0$ is the original length of the film (10 cm) and L is the length of the film after shrinking treatment.

(8) Shrinkage C

A square film of 10 cm sides was subjected to shrinking treatment for 5 sec in a warm water at a temperature of 75°±0.5° C. without load, and the shrinkage of the film was obtained in both of the machine direction and the transverse direction according to the following formula. The direction which showed the larger shrinkage was decided to be the main shrinking direction.

$$\text{Shrinkage } C\,(\%) = \frac{L_0 - L}{L_0} \times 100$$

wherein $L_0$ is the original length of the film (10 cm) and L is the length of the film after being contracted.

(9) Neck-in rate

The film is cut into rectangular of not smaller than 13 cm in the main shrinking direction and 10 cm in the other direction, and the both ends in the main shrinking direction were fixed to a metal frame of 13×10 cm in the inner length. Thereafter, the maximum shrinkage of the film in the direction perpendicular to the main shrinking direction was obtained, and the thus obtained value was decided to be the neck-in rate.

(10) Shrinking stress

While using an INTESCO tester of type 2001 (made by INTESCO Co., Ltd.), a strip of the film of 15 mm width was cut out along the main shrinking direction. The strip was fixed to a chuck of an interval of 50 mm, and the thus treated strip was closely kept for one min in an air oven at 100° C. The maximum shrinking stress shown by the film during the preservation was decided to be the shrinking stress of the film.

(11) Intrinsic viscosity of the film [$\eta$]

Into 20 ml of 50:50 mixed solvent of phenol and tetrachloroethane, 200 mg of the film were added and after dissolving the film by heating for one hour at about 110° C., the intrinsic viscosity of the film was measured at 30° C.

(12) Warm water resistance of the film

After adhering the film to a cylindrical PET bottle for soft drink, the thus labelled bottle was subjected to sterilization treatment for 10 min by warm water at 90° C. After carrying out the treatment, the case where a slackness was occurred between the film and the bottle or the case where wave-like wrinkles were caused on the film was designated as x, and the case where the close adherence of the film to the bottle was not changed at all was designated as o.

(13) Evaluation (A) of the film as the shrinkable film

After attaching the film as a shrinkable label onto a bottle in the similar manner in (12), the thus treated bottle was subjected to sterilization treatment by warm water. The case where no deformation of drawing was caused; the degree of shrinking of the film was sufficient; the close adhesion of the film to the bottle was excellent; the film was sufficiently transparent and whitening, wrinkles and slack did not occur on the film by sterilization treatment was designated as o, and the other cases were designated as x.

(14) Handling property in drying

The polyester used as the material for the film which can be subjected to the drying method used for drying the conventional polyethylene terephthalate was designated as o, and the case where it was necessary to use vacuum drying, etc. was designated as x.

(15) Shrinking property (A)

The film was made to a cylindrical form by heat-sealing and after covering a bottle with the cylindrical film, the film was subjected to shrinking treatment for 30 sec in an air oven at 150° C. together with the bottle and then the bottle was taken out from the air oven. The film having thereon 0 to 5 wrinkles of longer than 5 mm was designated as o; the film having thereon 6 to 10 of such wrinkles was designated as $\Delta$ and the film having more than 11 of such wrinkles was designated as x.

(16) Evaluation (B) of the film as the shrinkable film

After attaching the film as a shrinkable label onto a bottle in the similar manner in (15), the thus treated bottle was subjected to sterilization treatment by warm water. The case where no deformation of drawing was caused; wrinkles occurred scarcely on the film; the degree of shrinking of the film was sufficient; the close adhesion of the film to the bottle was excellent; whitening, wrinkles and slack did not occur on the film by sterilization treatment and the film was very much favorable was designated as ⊙. The case where although there were some slight problems in the shrinked film, no practical problem was found therein was designated as o, and the case where the shrinked film did not fulfill the required conditions and was unsuitable as the shrinkable film was designated as x.

(17) Glass transition temperature of polyester (Tg(°C.))

The glass transition temperature of the polyester was measured by a DSC-1B tester made by Perkin Elmer Co. under the sensitivity of 2 and the temperature increasing speed of 4° C./min.

(18) Distortion of the heat-sealed part

The film was made to a cylindrical form by heat-sealing and after covering a glass bottle with the cylindrical film, the thus treated glass bottle was passed through a shrink tunnel to shrink the film. After shrinking treatment, the case where no deformation of the drawing in the periphery of the heat-sealed part occurred was designated as o; the case where some deformation of the drawing occurred without causing practical problems was designated as $\Delta$ and the case where deformation of the drawing was severe and the film was undesirable as the label was designated as x.

(19) Evaluation (C) of the film as the shrinkable film

After attaching the film as the label onto a glass bottle as in (18), the thus treated glass bottle was subjected to sterilization treatment for 15 min by warm water at 85° C.

Thereafter, the appearance of the film such as wrinkles, distortion and slack and the resistance of the film against breaking at the time of transporting the film, etc. were evaluated collectively. Then, the case where no problem was found on the film was designated as o; the case where there was no practical problem although some defects were found in appearance of the film was designated as Δ and the case where the film was not suitable for the practical use was designated as x.

(20) Breaking strength in the main shrinking direction

The film of 15 mm in width fixed to a chuck of an interval of 50 mm was stretched at 20° C. and RH of 65% by a TENSILON tester made by TOYO-BALD-WIN Co., UTN-III type at a stretching speed of 50 mm/min, and the strength of the film at the time of breaking was divided by the cross-sectional area of the original film. The thus obtained value was shown by kg/mm$^2$.

(21) Degree of yellowness of the film

The degree of yellowness of the film was measured while following the method described in Japanese Industrial Standards (JIS) K 7103.

(22) Degree of generation of sublimates

The generation of the sublimates and the adhesion of the sublimates around the extruder, the casting rolls, the stretching rolls and the film at the time of producing the film were judged by eye measurement. The case where the generation of the sublimates was scarcely noticed and there was no influence on the continuous operation of the apparatus was designated as A; the case where although some adhesion of the sublimate to the apparatus was noticed, the influence thereof on the film was not so much was designated as B and the case where a large amount of the sublimates generated and began to adhere to the film during the long time of operation of the apparatus to make the continuous operation of the apparatus difficult was designated as C.

(23) Evaluation (D) of the film as the shrinkable film

After making the film into a cylindrical form using an adhesive and covering a glass bottle with the cylindrical film, the thus treated bottle was passed through a shrink tunnel to closely attach the film to the bottle. After shrinking treatment of the film, the appearance of the film such as wrinkles, slack and yellowness, and the resistance of the film to breaking at the time of transportation of the labelled bottle were evaluated collectively. The case without any problem was designated as o; the case where the appearance of the film is a little poor, however, there was no practical problem was designated as Δ and the case where the film was not suitable for the practical use was designated as x.

(24) Evaluation (E) of the shrinkable film for labelling

After making the film into a cylindrical form using an adhesive and covering a large glass bottle of 30 cm in height, 15 cm in diameter of the bottom and 3 cm in diameter of the mouth with the cylindrical film from the bottom to the shoulder of the bottle, the thus treated bottle was passed through a shrink tunnel in which the steam temperature was adjusted to 85° C. to attach the film to the bottle. The degree of the close adhesion of the film to the bottle and the degree of generation of wrinkles and slack on the film were evaluated. The favorable case was designated as o and the case where the state of the film was not favorable was designated as x.

(25) Evaluation of the prevention of the scattering of broken pieces of glass

The glass bottle covered with the film as in (24) was dropped from the 1.5 m height to a concrete floor, and the degree of the scattering of the broken pieces of glass was evaluated.

The case where the broken pieces of glass dangerously scattered in all directions after the breaking of the bottle was designated as x; the case where some of the broken pieces of glass were scattered was designated as Δ and the case where the broken pieces of glass were protected by the film and scarcely scattered was designated as o.

(26) Shrinking property (B) of the film

After making the film into a cylindrical form, a PET bottle was covered with the cylindrical film and the thus treated bottle was passed through a steam shrink tunnel at a temperature of 75° C. to shrink the film. After passing through the tunnel, the state of close adhesion of the film to the bottle was judged by eye measurement, and the result was evaluated by o or x based on the degree of close adhesion.

Besides, whether the upper end or the lower end of the film was deformed obliquely or not, or the end was distorted or not was judged by eye measurement, and the result was designated as the shrinking unevenness by o and x. As the collective evaluation, the case where the film satisfied the above two items and whitening, wrinkles, etc. were not noticed at all on the film was designated as o, and the case where the film did not satisfy was designated as x.

(27) Elongation at break of the film in the direction perpendicular to the main shrinking direction After fixing a film of 15 mm width (the main shrinking direction) between the chucks under the interval of 50 mm of the INTESCO tester (made by INTESCO Co., Ltd., 2001 model), the film was stretched at a stretching speed of 200 mm/min to measure the elongation at break of the film.

(28) Average surface roughness of the film (Ra)

The average surface roughness of the film was obtained as follows by using a surface roughness meter (made by KOSAKA Laboratory Co., the model of SE-3FK). The radius of the tip of the touching needle was 2 μm and the load was 30 mg.

From the curve of the cross section of film, a part with a length L (2.5 mm) was sampled out along the direction of the center line. The curve was expressed as the roughness curve y=f(x) by assuming the center line of the sampling part as x-axis and the direction perpendicular to x-axis as y-axis. The value calculated from the following formula was represented by μm as the average surface roughness of the film. The cutoff value was 80 μm, and Ra was measured at 5 points in the machine direction and 5 points in the transverse direction (in total, at 10 points) and the mean value of the measured values was obtained as the average surface roughness.

$$Ra = \frac{1}{L} \int_0^L |f(x)| dx$$

(29) Shrinking property (C) of the film

After making the film into a cylindrical form, a narrow necked heat-resistance PET bottle was covered with the cylindrical film and the thus treated bottle was passed through a shrink tunnel at a temperature of 95° C. within 5 sec to shrink the film. After passing through the tunnel, the degree of close adhesion of the film to the bottle was judged by eye measurement and the result was evaluated by o and x based on the degree of close adhesion. Besides, whether the upper end or the lower end of the film was deformed obliquely or not or was distorted or not was judged by eye measurement, and the result was evaluated as the shrinking unevenness by o and x. As the collective evaluation, the case where the film satisfied the above two items and whitening, wrinkles, etc. were not noticed at all on the film was designated as o, and the case where the film did not satisfy was designated as x.

made into a shrinkable film in the same manner as in Example 1. The thickness of the thus obtained film was 35 μm.

The various physical properties of the films obtained in the Examples 1 to 3 and the result of evaluation of the films as the shrinkable label are collected in Table 1. From Table 1, it is understood that the films respectively obtained in Examples 1 to 3 are excellent as the shrinkable film.

The film obtained in Example 3 is favorable in its physical properties. However, for drying the chips of the polyester used in Example 3, a special method such as vacuum drying was necessary.

TABLE 1

| | birefringence | shrinkage A (%) | | shrinkage after printing (%) | | shrinking stress (g/mm²) | haze before warm water treatment (%) | haze after warm water treatment (%) | warm water resistance | evaluation (A) | heat of fusion (cal/g) | handling property in drying |
|---|---|---|---|---|---|---|---|---|---|---|---|---|
| | | machine direction | transverse direction | machine direction | transverse direction | | | | | | | |
| Ex. 1 | 0.060 | 65 | 0 | 64 | 0 | 620 | 3.0 | 3.0 | O | O | 6.3 | O |
| Ex. 2 | 0.080 | 5 | 69 | 5 | 69 | 580 | 3.0 | 3.0 | O | O | 5.5 | O |
| Ex. 3 | 0.058 | 67 | 0 | 60 | 0 | 550 | 3.0 | 3.0 | O | O | —*1 | X |

*1: Peaks due to fusion was undectable

EXAMPLE 1

After preliminarily crystallizing a polyester having the intrinsic viscosity of 0.70 which comprises 85 mol % of terephthalic acid and 15 mol % of isophthalic acid as the dicarboxylic acid component and ethylene glycol as the glycol component, the thus treated polyester was dried and extruded to obtain an unstretched film. By stretching the thus obtained unstretched film by 3 times in the machine direction between a stretching roll at 80° C. and a cooling roll and winding up the thus stretched film, a film according to the present invention was obtained. The thickness of the thus obtained film was 35 μm.

EXAMPLE 2

The polyester having the intrinsic viscosity of 0.75 obtained by solid phase polymerization, which comprises 97 mol % of terephthalic acid and 3 mol % of isophthalic acid as the dicarboxylic acid component 80 mol % of ethylene glycol and 20 mol % of diethylene glycol as the glycol component, was dried and extruded to obtain an unstretched film. The thus obtained unstretched film was directly introduced into a tenter. After stretching the film by 3.5 times at 85° C. therein and then cooling the stretched film by a cooled air at 25° C., the film was wound up to obtain a shrinkable film.

The thickness of the thus obtained contractile film was 50 μm.

EXAMPLE 3

After vacuum drying a polyester of the intrinsic viscosity of 0.70, which comprises 65 mol % of terephthalic acid and 35 mol % of isophthalic acid as the dicarboxylic acid component and ethylene glycol as the glycol component, the polyester was extruded and

EXAMPLE 4

After preliminarily crystallizing a polyester of the intrinsic viscosity of 0.72 and the glass transition temperature of 62° C., which comprised the dicarboxylic acid component 80 mol % of terephthalic acid and 20 mol % of isophthalic acid as the dicarboxylic acid component and ethylene glycol as the diol component and contained 500 ppm of amorphous silica of 1.2 μm in the mean particle diameter, the polyester was dried and extruded by an usual method to obtain an unstretched film.

The thus obtained unstretched film was stretched by 3.5 times between the stretching roll at 75° C. and the cooling roll and the stretched film was wound up to obtain a film of 40 μm in the mean thickness.

The various physical properties of the film obtained in Example 4 and the result of evaluation of the film as the shrinkable label are collected in Table 2. From Table 2, it is understood that the film obtained in Example 4 is excellent as the shrinkable film.

TABLE 2

| | birefringence | shrinkage A (%) | | warm water resistance | unevenness of thickness (%) | | static friction coefficient | shrinking property (A) | evaluation (B) | heat of fusion (cal/g) |
|---|---|---|---|---|---|---|---|---|---|---|
| | | machine direction | transverse direction | | machine direction | transverse direction | | | | |
| Ex. 4 | 0.080 | 71 | 1 | O | 12 | 8 | 0.9 | O | ⊚ | 4.8 |

EXAMPLES 5 and 6

After preliminarily crystallizing a polyester having the intrinsic viscosity of 0.70 and the glass transition temperature of 75° C., which comprised terephthalic acid as the dicarboxylic acid component and 80 mol % of ethylene glycol and 20 mol % of neopentyl glycol as the diol component and contained 600 ppm of amorphous silica of 1.0 μm in the mean particle diameter, by a paddle drier, the polyester was subjected to drying. The dried polyester was extruded from an extruder at 260° C. The extruded material was rapidly cooled to be an unstretched film.

The unstretched film was introduced directly into a tenter and after stretching the film by 3.0 times (Example 5) and 4.0 times (Example 6) in the transverse direction, the stretched film was rapidly cooled by a cooled air at 25° C. to obtain a film of 40 μm in the mean thickness.

EXAMPLE 7

A polyester having the intrinsic viscosity of 0.69 and the glass transition temperature of 74° C., which comprised terephthalic acid as the dicarboxylic acid component and 60 mol % of ethylene glycol, 38 mol % of neopentyl glycol and 2 mol % of polyethylene glycol of a molecular weight of 3,000 and contained the same particle was in Example 5 was made into a film in the same manner as in Example 6 except for carrying out the vacuum drying of the polyester, thereby obtaining a film of 40 μm in the mean thickness.

The constituting components and the various physical properties of the films respectively obtained in Examples 5 to 7 are collected in Table 3.

As are seen in Table 3, the films respectively obtained in Examples 5 to 7 fulfill the various properties which are necessary for the shrinkable film for use in labelling.

However, it was necessary to use a special method of drying such as vacuum drying in order to dry the polyester of Example 7.

EXAMPLE 9

Into an apparatus for esterification provided with a stirrer, a fractionator, an inlet for introducing the raw materials and the adjuvants and an outlet for drawing the reaction product out from the apparatus, 85 parts by weight of an oligomer of bis($\beta$-hydroxyethyl) terephthalate and 15 parts by weight of an oligomer of bis($\beta$-hydroxyethyl) isophthalate were introduced and after adding 74 parts by weight of terephthalic acid, 13 parts by weight of isophthalic acid and 42 parts by weight of ethylene glycol to the content of the apparatus, esterification reaction was carried out at 260° C. under an atmospheric pressure. After 4 hours from the start of the reaction, a polyester oligomer was obtained at the rate of esterification reaction of 97%.

In the next place, 106 parts by weight of the reaction mixture (corresponding to 87 parts by weight of the aromatic dicarboxylic acid) was taken out from the apparatus, and 0.05 parts by weight of minute silica of 1.1 μm in the mean particle diameter and 0.02 parts by weight of phosphoric acid were added thereto while maintaining the temperature at 260° C.

In the next place, 0.03 part by weight of antimony trioxide was added to the mixture, and the mixture was subjected to polymerization while following the usual method. Namely, after adding antimony trioxide, the

TABLE 3

| | dicarboxylic acid component (mol %) | | diol component (mol %) | | shrinkage A (%) | | | | | distortion | |
|---|---|---|---|---|---|---|---|---|---|---|---|
| | terephthalic acid unit | isophthalic acid unit | ethylene glycol unit | neopentyl glycol unit | machine direction | transverse direction | birefringence | heat of fusion (cal/g) | breaking strength (kg/mm²) | of heat-sealed part | evaluation (C) |
| Ex. 5 | 100 | 0 | 80 | 20 | 1 | 67 | 0.060 | 3.2 | 27.0 | ○ | ○ |
| Ex. 6 | 100 | 0 | 80 | 20 | 2 | 75 | 0.095 | 3.2 | 30.6 | ○ | ○ |
| Ex. 7 | 100 | 0 | 60 | 38 | 0 | 75 | 0.092 | —*1 | 23.4 | ○ | ○ |

Note:
*1 The peak of fusion could not be detected.

EXAMPLE 8

A polyester having the intrinsic viscosity of 0.72 and the glass transition temperature of 74° C., which comprised terephthalic acid as the dicarboxylic acid component and 88 mol % of ethylene glycol, 10 mol % of neopentyl glycol and 2 mol % of diethylene glycol as the diol component, was dried in an usual method using a hopper drier and the dried polyester was extruded at 270° C. The extruded polyester was rapidly cooled to be solidified to obtain an unstretched film.

The unstretched film was stretched by 3.5 times in the machine direction between the stretching roll at 80° C. and the cooling roll at 20° C., and the stretched film was wound up to obtain a film of 80 μm in the mean thickness. The heat of fusion of the film was 4.7 cal/g.

The various physical properties of the film are shown in Table 4.

From the result in Table 4, it is understood that the film satisfies the required properties of the shrinkable film for use in labelling.

TABLE 4

| | shrinkage A (%) | | | distortion | |
|---|---|---|---|---|---|
| | machine direction | transverse direction | birefringence | of heat-sealed part | evaluation (C) |
| Ex. 8 | 71 | 1 | 0.078 | ○ | ○ | temperature of the reaction system was raised to 275° C. and the inner pressure of the reaction system was reduced to 15 mmHg within 100 min, and the inner pressure was thereafter gradually reduced finally to 0.3 mmHg. After 5 hours, the reaction was stopped to obtain a polymer having the intrinsic viscosity of 0.72 and the glass transition temperature of 63° C.

After chipping the obtained polymer by the usual method, the chips were dried according to the usual method while using a hopper drier, and the dried polymer chips were melt-extruded by an extruder at 260° C. into a sheet form. The sheet was rapidly cooled to obtain an unstretched film.

By stretching the unstretched film by 3.0 times between the stretching roll at 72° C. and the cooling roll, a film of about 30 μm in the mean thickness was obtained.

EXAMPLE 10

In the same manner as in Example 9 except for using 0.011 part by weight of germanium dioxide as the catalyst for polycondensation instead of 0.03 part by weight of antimony trioxide in Example 9, a film of 30 μm in thickness was obtained.

EXAMPLE 11

Into the same apparatus as in Example 9, 70 parts by weight of an oligomer of bis(8-hydroxyethyl) terephthalate and 30 parts by weight of an oligomer of bis(8hydroxyethyl) isophthalete were introduced and 61 parts by weight of terephthalic acid, 26 parts by weight of isophthalic acid and 42 parts by weight of ethylene glycol were added thereto. The thus introduced material were polymerized in the same manner as in Example 9 except for using 0.035 part by weight of kaolin of 1.4 μm in the mean particle diameter instead of minute silica in Example 12 and 0.04 part by weight of antimony pentoxide in stead of 0.03 part by weight of antimony trioxide.

The thus obtained polyester (Polyester A) showed the intrinsic viscosity of 0.74 and the glass transition temperature of 64° C.

Besides, by following the method of polymerization for obtaining polyester A, the polyethylene terephthalate (Polyester B) showing the intrinsic viscosity 0.66 and the glass transition temperature of 67° C. was obtained.

After blending the Polyester A and the Polyester B in a molar ratio of 80:20, the blend was dried, extruded at 290° C. and rapidly cooled to obtain an unstretched film.

The unstretched film was introduced into a tenter directly, and after stretching the film by 4.0 times at 75° C., the stretched film was cooled and wound up to obtain a shrinkable film of 100 μm in the mean thickness.

The composition ratio of terephthalic acid (TPA) to isophthalic acid (IPA) in the dicarboxylic acid component in the respective films obtained in Examples 9 to 11, and the various physical properties of the films are collected in Table 5.

As are seen in Table 5, the respective films of Examples 9 to 11 are excellent in the color tone, the shrinking properties, the strength and the productivity, and are very excellent as the shrinkable film for use in packaging and labelling.

TABLE 5

|  | TPA/IPA (molar ratio) | shrinkage A (%) machine direction | transverse direction | breaking strength* (kg/mm²) | degree of yellowness | degree of generation of sublimates | evaluation (D) |
|---|---|---|---|---|---|---|---|
| Ex. 9 | 85/15 | 67 | 2 | 31.0 | 3.0 | A | ◯ |
| Ex. 10 | 85/15 | 67 | 2 | 31.0 | 5.5 | B | ◯ |
| Ex. 11 | 76/24 | 3 | 74 | 28.0 | 3.5 | A | ◯ |

*measured in the main shrinking direction

EXAMPLE 12

After preliminarily crystallizing a polyester having the intrinsic viscosity of 0.75 and the glass transition temperature of 60° C., which comprised 80 mol % of terephthalic acid and 20 mol % of isophthalic acid as the dicarboxylic acid component and 98 mol % of ethylene glycol and 2 mol % of diethylene glycol as the diol component and contained 400 ppm of amorphous silica of 1.5 μm in the mean particle diameter, the polyester was dried and extruded according to an usual method to obtain an unstretched film. By stretching the unstretched film between the stretching roll at 70° C. and the cooling roll by 4.0 times, a film of 50 μm in the mean thickness was obtained.

EXAMPLE 13

After drying a polyester having the intrinsic viscosity of 0.73 and the glass transition temperature of 63° C., which comprised 85 mol % of terephthalic acid and 15 mol % of isophthalic acid as the dicarboxylic acid component and 95 mol % of ethylene glycol and 5 mol % of polyethylene glycol of the molecular weight of 1,500 as the diol component and contained 500 ppm of the uniform precipitated minute particles of the particle diameter of from 0.5 to 1.2 μm comprising calcium, lithium and phosphorus, in an usual method, the dried polyester was extruded and rapidly cooled to obtain an unstretched film. After introducing the unstretched film directly into a tenter, stretching the film by 3.8 times at 75° C. and cooling the stretched film by a cooled air at 35° C., the film was wound up to obtain a shrinkable film of 70 μm in the mean thickness.

The various physical properties of the respective films obtained in Examples 12 and 13 and the result of evaluation of the films as the shrinkable film for use in labelling are shown in Table 6.

As are seen in Table 6, the films of Examples 12 and 13 sufficiently possess the properties necessary for the shrinkable film for use in labelling the large type glass bottles.

TABLE 6

|  | shrinkage B (%) machine direction | transverse direction | breaking strength (kg/mm²) machine direction | transverse direction | evaluation (E) | prevention of scattering of broken glass |
|---|---|---|---|---|---|---|
| Ex. 12 | 75 | 4 | 32.0 | 8.1 | ◯ | ◯ |
| Ex. 13 | 5 | 73 | 7.9 | 30.8 | ◯ | ◯ |

EXAMPLES 14 and 15

After preliminarily crystallizing a polyester having the intrinsic viscosity of 0.70 and the glass transition temperature of 66° C., which comprised 80 mol % of terephthalic acid and 20 mol % of isophthalic acid as the dicarboxylic acid component and 98 mol % of ethylene glycol and 2 mol % of diethylene glycol as the diol component and contained 500 ppm of spherical silica of 0.8 μm in the mean particle diameter, by a paddle drier, the polyester was subjected to the main drying and then extruded from an extruder at 260° C. The extruded material was rapidly cooled and solidified to obtain an unstretched film.

The unstretched film was introduced directly into a tenter and after stretching the film by 3.2 times (Example 14) and 4.0 times (Example 15) in the transverse direction and subjecting the stretched film to heat treatment for 10 sec at 75° C., the film was cooled to obtain a film of about 40 μm in the mean thickness.

EXAMPLE 16

After drying a polyester having the intrinsic viscosity of 0.66 and the glass transition temperature of 75° C., which comprised terephthalic acid as the dicarboxylic acid component and 85 mol % of ethylene glycol and 15 mol % of neopentyl glycol as the dial composition and contained 300 ppm of amorphous silica of 1.2 μm in the mean particle diameter, in a vacuum drier, the dried polyester was extruded from an extruder at 280° C. and the extruded material was rapidly cooled and solidified to obtain an unstretched film.

After stretching the unstretched film by 1.02 times into the machine direction, the stretched film was introduced into a tenter and further stretched by 3.8 times in the transverse direction while controlling the surface temperature of the film to 85° C. at the beginning of the stretching and to 65° C. at the finishing of the stretching. After the stretching, the stretched film was subjected to heat treatment for 5 sec at 85° C., then cooled and wound up to obtain a film of about 30 μm in the mean thickness.

EXAMPLE 17

After drying a polyester having the intrinsic viscosity of 0.67 and the glass transition temperature of 63° C., which comprised terephthalic acid as the dicarboxylic acid component and 85 mol % of ethylene glycol and 15 mol % of diethylene glycol as the glycol component and contained 500 ppm of the uniform precipitated minute particles of the particle diameter of from 0.5 to 1.0 μm comprising calcium, lithium and phosphorus, the polyester was extruded as in Example 14 to obtain an unstretched film.

After stretching the unstretched film by 3.5 times between the stretching roll at 73° C. and the cooling roll in the machine direction, the stretched film was heat treated by contacting the film to a heating roll at 80° C. and then the heat treated film was wound up to obtain a film of about 60 μm in the mean thickness.

The various physical properties of the respective films obtained in Examples 14 and 17 and the result of evaluation of the shrinking properties of the films are shown in Table 7.

As are seen in Table 7, the films of Examples 14 to 17 possess the excellent properties as the shrinkable film for use in labelling.

EXAMPLE 18

After drying a polyester having the intrinsic viscosity of 0.66 and the glass transition temperature of 75° C., which comprised terephthalic acid as the dicarboxylic acid component and 87 mol % of ethylene glycol and 13 mol % of neopentyl glycol as the diol component and contained 350 ppm of amorphous silica of 1.2 μm in the mean particle diameter, by a vacuum drier, the dried polyester was extruded at 280° C. by an extruder, rapidly cooled and solidified to obtain an unstretched film.

After stretching the unstretched film by 1.1 times at 82° C. in the machine direction, the stretched film was introduced into a tenter and further stretched by 4.0 times in the transverse direction while controlling the surface temperature of the film to 100° C. at the starting of the stretching and to 65° C. at the finishing of the stretching. After finishing the stretching, the stretched film was subjected to heat treatment for 6 sec at 92° C., then cooled and wound up to obtain a film of about 60 μm in the mean thickness.

EXAMPLE 19

After preliminarily crystallizing a polyester having the intrinsic viscosity of 0.70 and the glass transition temperature of 66° C., which comprised 80 mol % of terephthalic acid and 20 mol % of isophthalic acid as the dicarboxylic acid component and 98 mol % of ethylene glycol and 2 mol % of diethylene glycol as the diol component and contained 500 ppm of spherical silica of 0.8 μm in the mean particle diameter, by using a paddle drier, the polyester was subjected to the main drying and then extruded at 260° C. by an extruder. The extruded material was rapidly cooled and solidified to obtain an unstretched film.

After stretching the unstretched film by 3.2 times in the transverse direction at 70° C., the stretched film was subjected for 10 sec to heat treatment and was cooled to obtain a film of about 40 μm in the mean thickness.

EXAMPLE 20

After drying a polyester having the intrinsic viscosity of 0.73 and the glass transition temperature of 69° C., which comprised 90 mol % of terephthalic acid and 10 mol % of phthalic acid as the dicarboxylic acid component and 95 mol % of ethylene glycol and 5 mol % of diethylene glycol as the diol component and contained 800 ppm of calcium carbonate particles of 1.0 μm in the mean particle diameter, by using an usual method, the dried polyester was extruded at 300° C. and rapidly cooled to obtain an unstretched film.

The unstretched film was stretched by 4.0 times between the heating—stretching roll at 75° C. and the cooling roll while relaxing the film at 5% into the transverse direction.

After the stretching, the stretched film was wound up and the film was subjected to UV irradiation of 15 mJ/cm$^2$ using carbon arc after unwinding the film. Then the film was wound up again to obtain a film of about 30 μm in the mean thickness.

The various physical properties of the respective films obtained in Examples 18 to 20 and the result of evaluation of the shrinking properties of the films are shown in Table 8.

TABLE 7

| | stretching temperature (°C.) | stretch ratio | heat treatment temperature (°C.) | birefringence (Δn) | shrinkage C (%) machine direction | shrinkage C (%) transverse direction | neck-in rate (%) | shrinking property (B) degree of close adhesion | shrinking unevenness | collective evaluation |
|---|---|---|---|---|---|---|---|---|---|---|
| Ex. 14 | 70 | 3.2 | 75 | 0.067 | −1 | 48 | 12 | ○ | ○ | ○ |
| Ex. 15 | 70 | 4.0 | 75 | 0.105 | 0 | 45 | 10 | ○ | ○ | ○ |
| Ex. 16 | 85/65*[1] | 3.8*[2] | 85 | 0.090 | −1 | 52 | 11 | ○ | ○ | ○ |
| Ex. 17 | 73 | 3.5 | 80 | 0.082 | 50 | 0 | 13 | ○ | ○ | ○ |

*[1]temp. at the beginning of transverse stretching/temp. at the finishing of stretching
*[2]transverse stretching As are seen in Table 8, the respective films obtained in Examples 18 to 20 have the extremely excellent properties as the shrinkable film for use in labelling.

TABLE 8

| | shrinkage A (%) | | breaking strength | Bire- fringence | heat of fusion (cal/g) | Ra (μ) | shrinking property (C) | | | |
|---|---|---|---|---|---|---|---|---|---|---|
| | machine direction | transverse direction | | | | | neck-in rate (%) | degree of close adhesion | shrinking unevenness | collective evaluation |
| Ex. 18 | 2 | 34 | 8 | 0.085 | 4.7 | 0.028 | 2 | ○ | ○ | ○ |
| Ex. 19 | 1 | 41 | 14 | 0.062 | 4.2 | 0.021 | 4 | ○ | ○ | ○ |
| Ex. 20 | 55 | 0 | 32 | 0.081 | 5.6 | 0.042 | 5 | ○ | ○ | ○ |

What is claimed is:

1. A shrinkable monoaxially stretched polyester film which consists essentially of a crystalline polyester and has a birefringence of 0.040 to 0.150, shrinkage of not less than 50% in one direction of either the machine direction or the transverse direction after 5 min treatment in an air oven at 100° C., shrinkage of not more than 15% in the other direction after 5 min treatment in an air oven at 100° C., shrinkage of not less than 60% in one direction of either the machine direction or the transverse direction after 30 sec treatment in a warm water of 85° C., shrinkage of not more than 15% in the other direction after 30 sec treatment in a warm water of 85° C., and heat of fusion of not less than 2 cal/g, the crystalline polyester consisting essentially of a dicarboxylic acid component and a diol component, the dicarboxylic acid component of the crystalline polyester consisting essentially of terephthalic unit acid or terephthalic acid unit and isophthalic acid unit in the molar ratio of 50/50 to 95/5 and the diol component of the crystalline polyester consisting essentially of 50 to 97 mol % of ethylene glycol unit, 3 to 50 mol % of neopentyl glycol unit and 0 to 2 mol % of a unit selected from the group consisting of diethylene glycol unit and polyethylene glycol unit, the content of each diol unit being selected so that the sum thereof is 100 mol %.

2. The shrinkable polyester film according to claim 1, wherein the film haze after immersing said film in a warm water at 85° C. for 30 min under a tensioned and fixed condition is not more than 20%.

3. The shrinkable polyester film according to claim 1 or 2, wherein the unevenness of the thickness of said film in the machine direction and the transverse direction is not more than 30% and the static friction coefficient of said film is not more than 1.2.

4. The shrinkable polyester film according to claim 1, wherein the shrinking stress of said film in the main shrinking direction is not less than 100 g/mm² in air of 100° C.

5. The shrinkable polyester film according to claim 1, wherein the breaking strength of said film in the main shrinking direction is not less than 20 kg/mm².

6. The shrinkable polyester film according to claim 1 wherein the glass transition temperature of the polyester which constitutes said film is not lower than 65° C.

7. The shrinkable polyester film according to claim 1, wherein the shrinkage of said film after 2 weeks treatment in an air oven at 40° C. is not more than 3% in both the machine direction and the transverse direction.

8. A shrinkable monoaxially stretched polyester film which consists essentially of a crystalline polyester and has a shrinkage of not more than 30% in one direction of either the machine direction or the transverse direction after 5 sec treatment in a warm water at 75° C., a shrinkage of not more than 10% in the other direction after 5 see treatment in a warm water at 75° C., and a specific (maximum) shrinkage (the neck-in rate) of not more than 20% in the other direction after 5 see treatment in a warm water at 75° C., the crystalline polyester consisting essentially of a dicarboxylic acid component and a diol component, the dicarboxylic acid component of the crystalline polyester consisting essentially of terephthalic acid unit or terephthalic acid unit, and isophthalic acid unit in the molar ratio of 50/50 to 95/5 and the diol component of the crystalline polyester consisting essentially of 50 to 97 mol % of ethylene glycol unit, 3 to 50 mol % of neopentyl glycol unit and 0 to 2 mol % of a unit selected from the group consisting of diethylene glycol unit and polyethylene glycol unit, the content of each diol unit being selected so that the sum thereof is 100 mol %.

9. The shrinkable polyester film according to claim 8, wherein the birefringence of said film is not less than 0.050.

10. A shrinkable monoaxially stretched polyester film which consists essentially of a crystalline polyester and has a shrinkage of not less than 30% in one direction of either the machine direction or the transverse direction after 5 min treatment in an air oven at 100° C., a shrinkage of not more than 10% in the other direction after 5 min treatment in an air oven at 100° C., an elongation at break of 1 to 100% in the other direction, and a heat of fusion of not more than 8 cal/g, the crystalline polyester consisting essentially of a dicarboxylic acid treatment and a diol component, the dicarboxylic acid component of the crystalline polyester consisting essentially of terephthalic acid unit or terephthalic acid unit and isophthalic acid unit in the molar ratio of 50/50 to 95/5 and the diol component of the crystalline polyester consisting essentially of 50 to 97 mol % of ethylene glycol unit, 3 to 50 mol % of neopentyl glycol unit and 0 to 2 mol % of a unit selected from the group consisting of diethylene glycol unit and polyethylene glycol unit, the content of each diol unit being selected so that the sum thereof is 100 mol %.

11. The shrinkable polyester film according to claim 10, wherein the shrinkage of said film after 2 weeks treatment in an air oven at 40° C. is not more than 3% in the main shrinking direction and the transverse direction, and the birefringence is 0.040 to 0.120.

12. The shrinkable polyester film according to claim 10 or 11, wherein the specific (maximum) shrinkage (the neck-in rate) of said film after 5 sec treatment in warm water at 75° C. is not more than 10% in the direction perpendicular to the main shrinking direction and the breaking strength of said film is not less than 3 kg/mm².

13. The shrinkable polyester film according to claim 10, wherein the mean surface roughness of said film is 0.005 to 0.1 μm.

* * * * *